(12) United States Patent
Proeber

(10) Patent No.: US 10,458,641 B2
(45) Date of Patent: Oct. 29, 2019

(54) HOT STICK LIGHT

(71) Applicant: MILWAUKEE ELECTRIC TOOL CORPORATION, Brookfield, WI (US)

(72) Inventor: David Proeber, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/139,167

(22) Filed: Sep. 24, 2018

(65) Prior Publication Data

US 2019/0093876 A1 Mar. 28, 2019

Related U.S. Application Data

(60) Provisional application No. 62/625,524, filed on Feb. 2, 2018, provisional application No. 62/561,777, filed on Sep. 22, 2017.

(51) Int. Cl.
| | |
|---|---|
| *F21V 33/00* | (2006.01) |
| *F21L 4/02* | (2006.01) |
| *F21V 23/04* | (2006.01) |
| *H02J 7/00* | (2006.01) |

(Continued)

(52) U.S. Cl.
CPC ............... *F21V 33/00* (2013.01); *F21L 4/02* (2013.01); *F21V 21/088* (2013.01); *F21V 23/04* (2013.01);

(Continued)

(58) Field of Classification Search
CPC .. F21V 33/00; F21V 23/04; F21L 4/02; H02J 7/0052; H02G 1/00
See application file for complete search history.

(56) References Cited

U.S. PATENT DOCUMENTS

| | | |
|---|---|---|
| 5,130,642 A | 7/1992 | Hoffman et al. |
| 5,144,227 A | 9/1992 | Shaw |

(Continued)

FOREIGN PATENT DOCUMENTS

| | | |
|---|---|---|
| CN | 102636688 | 8/2012 |
| CN | 202903157 | 4/2013 |

(Continued)

OTHER PUBLICATIONS

UK International, "Litlink Instructions, Lights Up Your Hot Stick Tools for Safety and Efficiency," brochure (2006) 1 page, www.ukinternational.com.

(Continued)

*Primary Examiner* — Joseph L Williams
(74) *Attorney, Agent, or Firm* — Michael Best & Friedrich LLP

(57) ABSTRACT

A light for use with a hot stick includes an elongate body having a first connector configured to connect to the hot stick and a second connector configured to connect to a tool associated with the hot stick. The light also includes a first light source supported by the elongate body and having a first light emitting diode configured to emit light in a first direction relative to a longitudinal axis of the body, a second light source supported by the elongate body and having a second light emitting diode configured to emit light in a second direction relative to the longitudinal axis that is different than the first direction, a power source positioned within the elongate body and electrically coupled to the first light source and the second light source, and a user interface supported on the elongate body to control operation of the first and second light sources.

20 Claims, 16 Drawing Sheets

(51) Int. Cl.
    *H02G 1/00*         (2006.01)
    *F21V 21/088*     (2006.01)
    *F21Y 115/10*     (2016.01)

(52) U.S. Cl.
    CPC ......... *H02J 7/0052* (2013.01); *F21Y 2115/10* (2016.08); *H02G 1/00* (2013.01); *H02J 7/0047* (2013.01); *H02J 2007/0062* (2013.01)

(56) References Cited

U.S. PATENT DOCUMENTS

| | | | |
|---|---|---|---|
| 9,393,683 | B2 | 7/2016 | Bevins, Jr. et al. |
| 2007/0014108 | A1 | 1/2007 | Uke |
| 2015/0260386 | A1* | 9/2015 | Pepin ............... F21S 10/06 362/555 |
| 2016/0344170 | A1 | 11/2016 | Tamm |

FOREIGN PATENT DOCUMENTS

| | | |
|---|---|---|
| CN | 203225441 | 10/2013 |
| CN | 203660414 | 6/2014 |
| CN | 204156409 | 2/2015 |
| CN | 204205425 | 3/2015 |
| CN | 104581039 | 4/2015 |
| CN | 204271533 | 4/2015 |
| CN | 204315999 | 5/2015 |
| CN | 204424806 | 6/2015 |
| CN | 204793840 | 11/2015 |
| CN | 204886001 | 12/2015 |
| CN | 204927968 | 12/2015 |
| CN | 205543979 | 8/2016 |
| CN | 205752622 | 11/2016 |
| CN | 106341668 | 1/2017 |
| CN | 106371050 | 2/2017 |
| CN | 206283188 | 6/2017 |
| CN | 107069550 | 8/2017 |

OTHER PUBLICATIONS

UK Underwater Kinetics, "Hot Stick Tools," brochure (2006) 1 page, www.uwkinetics.com.

* cited by examiner

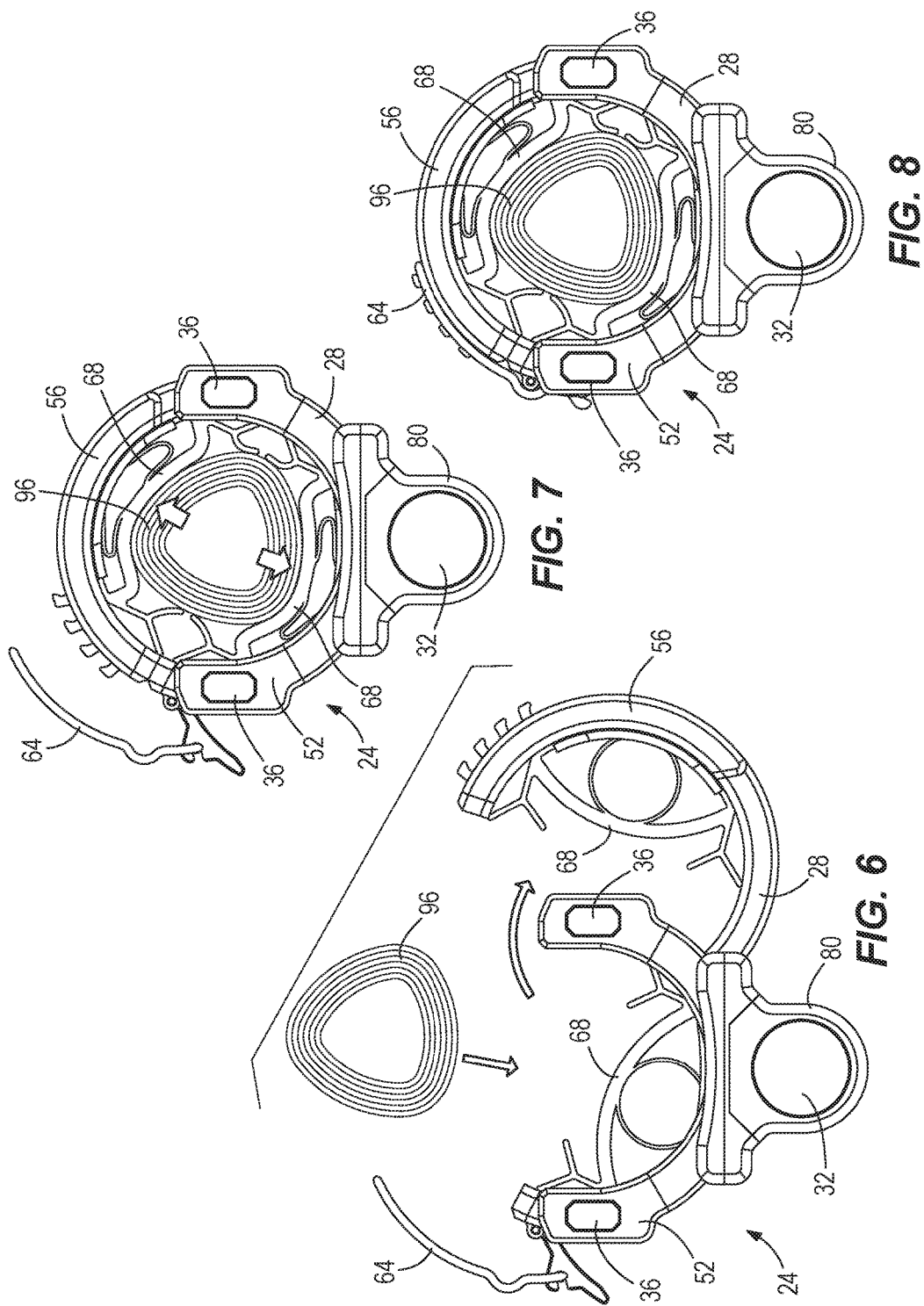

HOT STICK LIGHT

CROSS-REFERENCE TO RELATED APPLICATIONS

This application claims priority to U.S. Provisional Patent Application No. 62/561,777, filed Sep. 22, 2017, and to U.S. Provisional Patent Application No. 62/625,524, filed on Feb. 2, 2018, the entire contents of both of which are incorporated by reference herein.

BACKGROUND

The present invention relates to lights and, more particularly, to lights for use with hot sticks.

Power utility linemen, municipalities, and utility contractors work on high voltage power lines and equipment on a daily basis. Hot stick applications are common during outage situations at night, resulting in users needing light to perform their tasks. The most common light sources are headlamps, which do not provide enough light to illuminate the workspace, and spot lights, which are never in the right place and require a second user to spot the workspace. The tasks, equipment, and hot stick styles vary for outages so users need versatility of light spread and compatibility for different styles of hot sticks.

SUMMARY

In one aspect, the invention provides light for use with a hot stick. The light includes an elongate body having a first connector on a first end of the elongate body and a second connector on a second end of the elongate body. The first connector is configured to connect to the hot stick. The second connector is configured to connect to a tool associated with the hot stick. The elongate body defines a longitudinal axis extending through the first connector and the second connector. The light also includes a first light source supported by the elongate body and having a first light emitting diode configured to emit light in a first direction relative to the longitudinal axis, a second light source supported by the elongate body and having a second light emitting diode configured to emit light in a second direction relative to the longitudinal axis that is different than the first direction, a power source positioned within the elongate body and electrically coupled to the first light source and the second light source, and a user interface supported on the elongate body to control operation of the first and second light sources.

In another aspect, the invention provides a light for use with a hot stick. The light includes a body configured to be coupled to an end of the hot stick adjacent a tool associated with the hot stick. The body includes a battery compartment. The light also includes a light source supported by the body and having a light emitting diode configured to emit light toward the tool associated with the hot stick, a rechargeable battery pack positioned within the battery compartment, and a charging port supported by the body and electrically coupled to the rechargeable battery pack. The charging port is operable to recharge the rechargeable battery pack. The light further includes a power switch supported by the body and electrically coupled to the light source. The power switch is operable to control operation of the light source.

In yet another aspect, the invention provides a hot stick assembly including a hot stick, a tool associated with the hot stick, and a light including an elongate body having a first connector on a first end of the elongate body and a second connector on a second end of the elongate body. The first connector is connected to the hot stick light. The second connector is connected to the tool. The elongate body defines a longitudinal axis extending through the first connector and the second connector. The light also includes a first light source supported by the elongate body and having a first light emitting diode configured to emit light toward the tool in a first direction relative to the longitudinal axis, a second light source supported by the elongate body and having a second light emitting diode configured to emit light toward the tool in a second direction relative to the longitudinal axis that is different than the first direction, a power source positioned within the elongate body and electrically coupled to the first light source and the second light source, and a user interface supported on the elongate body to control operation of the first and second light sources.

Other aspects of the invention will e apparent by consideration of the detailed description and accompanying drawings.

BRIEF DESCRIPTION OF THE DRAWINGS

FIGS. 6-8 illustrate the light being attached to a hot stick.

DETAILED DESCRIPTION

Figure 1:
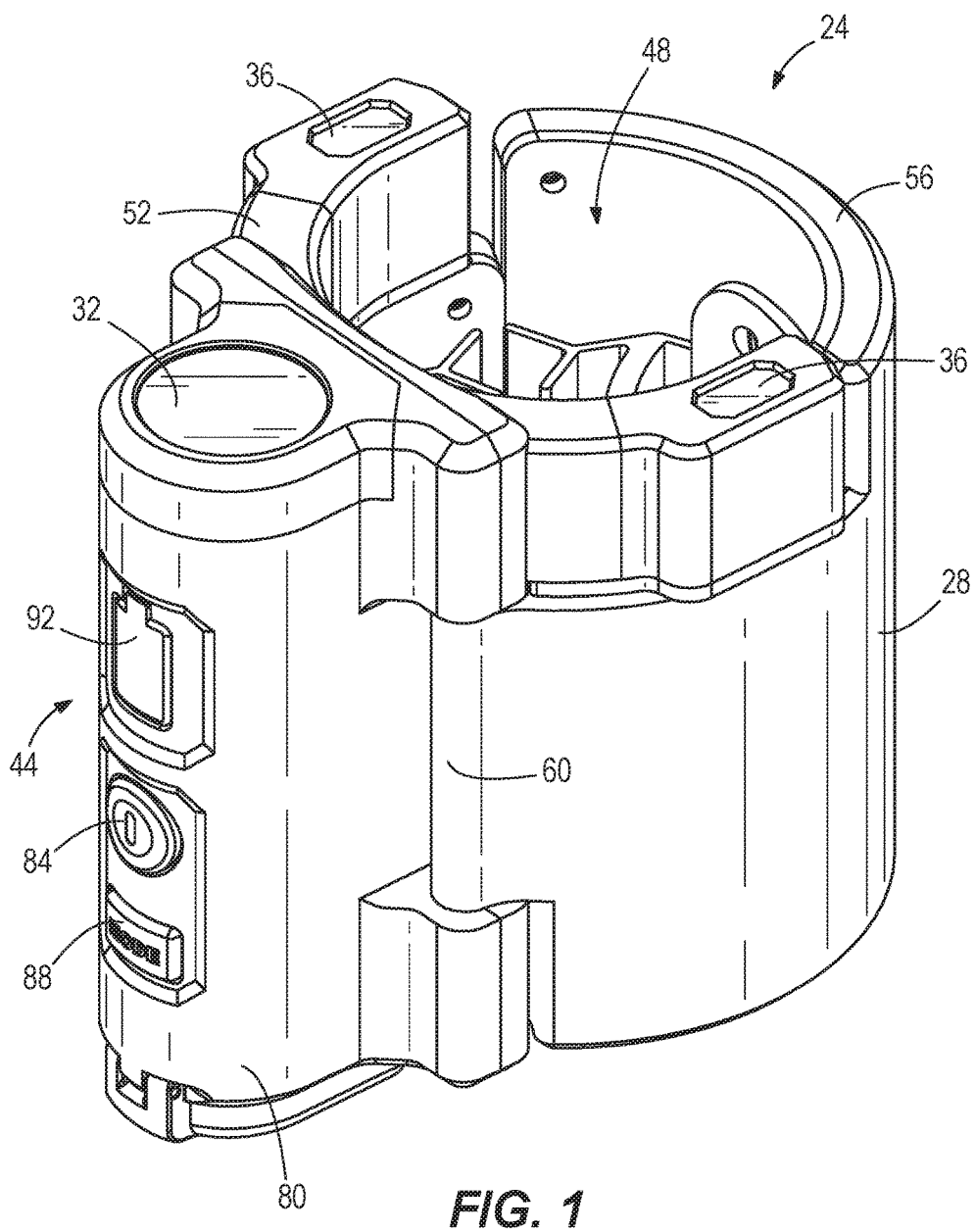
FIG. 1 is a front perspective view of a light for use with a hot stick.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Workers use hot sticks to service power lines. A hot stick is an insulated pole, usually made of fiberglass, used by electric utility workers when engaged on live-line working on energized high-voltage electric power lines, to protect them from electric shock. Depending on the tool attached to the end of the hot stick 20, it is possible to test for voltage, tighten nuts and bolts, apply tie wires (twisted lengths of ductile wire which fasten the running cable to its supporting insulators), open and close switches, replace fuses, lay insulating sleeves on wires, and perform various other tasks while not exposing the crew to a large risk of electric shock.

Hot sticks are made in different lengths, from a few feet long up to telescoping types of 30 feet length. Because the fiberglass provides electrical insulation, the hot stick allows utility workers to perform operations on power lines safely without de-energizing the power lines or while the state of the power lines is not yet known. This is essential because certain operations (such as opening or closing combination fuse/switches) are occasionally performed on an energized line. Additionally, after a fault occurs, the exact state of a line may not be certain; in this case, for reasons of crew safety, the utility workers should treat the line as though it were energized until it can be proven that it is not and safety ground cables can he applied to the line (so that the line is guaranteed to remain grounded/earthed while maintenance is performed upon the line). The hot stick not only electrically insulates the worker from the energized conductor, but also provides physical separation from the device being operated to reduce the chances of burns which might result from electrical arcing if there is a malfunction of the device being operated.

FIGS. 1-5 illustrate a light 24 for use with a hot stick. The illustrated light 24 includes a body 28, a first light source 32, a second light source 36, a power source 40 (FIG. 4), and a user interface 44. The body 28 is generally cylindrical and includes a central aperture 48 that receives the hot stick. In the illustrated embodiment, the body 28 is divided into two sections 52, 56 that are connected together with a hinge 60. The two sections 52, 56 are also releasably secured together in a closed position by a clamp mechanism 64. The hinged sections 52, 56 and the clamp mechanism 64 allow the body 28 to be positioned around a portion of the hot stick and secured in place. The clamp mechanism 64 includes an over-center clamp. The clamp mechanism 64 is thereby adjustable to fit around different sizes (e.g., diameters and/or shapes) of hot sticks. For example, in some embodiments, the light 24 can attach to hot sticks having diameters between 1 inch and 2.5 inches. In addition, the light 24 can attach to hot stick having circular, triangular, or other shaped cross-sections.

Figure 3:
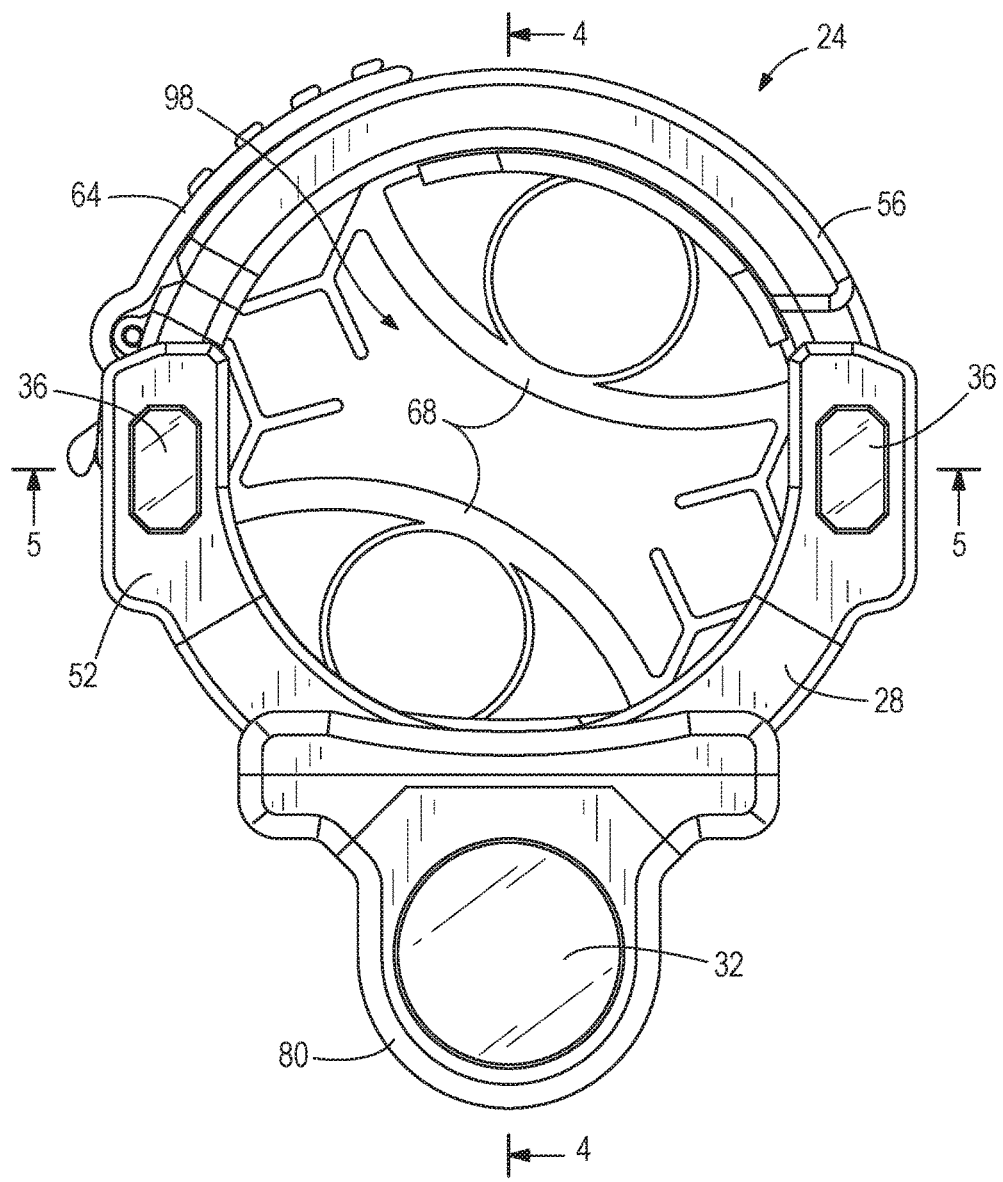
FIG. 3 is an end view of the light.

As shown in FIG. 3, the body 28 also includes gripping sections 68 positioned on an inner surface of the body 28. The illustrated gripping sections 68 are elastomeric members that deflect and deform to match the shape and size of the hot stick. The gripping sections 68 can be made of a single molded elastomeric piece, or can include two or more individual pieces. In some embodiments, the gripping sections 68 may include horizontal ribbing on surfaces that contact the hot stick to reduce vertical slipping along the stick. Additionally or alternatively, the gripping sections 68 can have other shapes and sizes.

Referring back to FIGS. 1 and 3, the first light source 32 is supported by the body 28. The first light source 32 includes a light emitting diode 72 (LED) (FIG. 4) and is configured to provide a spot light to illuminate a finger on the end of the hot stick. In the illustrated embodiment, the first light source 32 includes a single LEI), but may alternatively include multiple LEDs or an array of LEDs.

The second light source 36 is also supported by the body 28. The illustrated second light source 36 includes two LEDs 76 (FIG. 5) positioned on diametrically opposite sides of the body 28. The second light source 36 is configured to provide a flood light to illuminate an area around the hot stick. The two LEDs 76 are positioned radially from each other to avoid making shadows. In other embodiments, the second light source 36 may include more than two LEDs and/or the LEDs 76 may be located elsewhere on the body 28.

Figure 4:
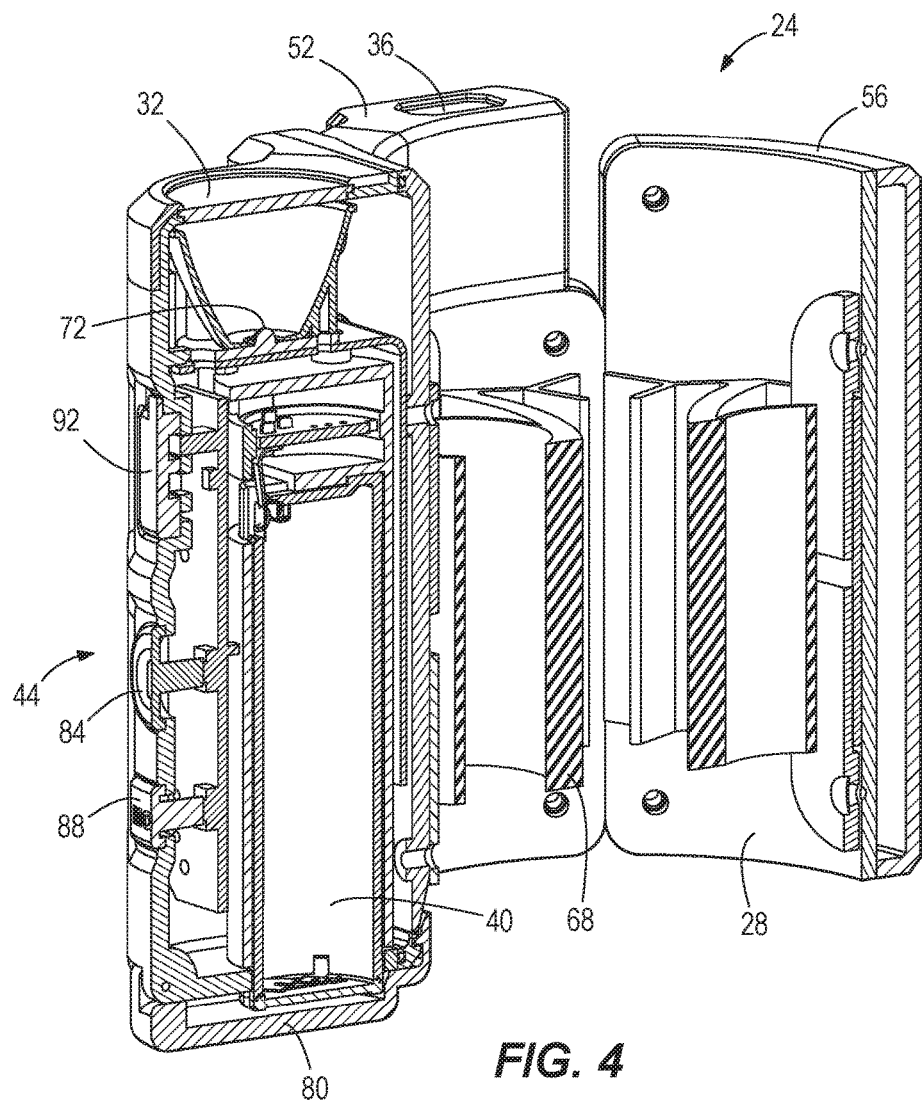
FIG. 4 is a cross-sectional view of the light, taken along section line 4-4 of FIG. 3.
Figure 5:
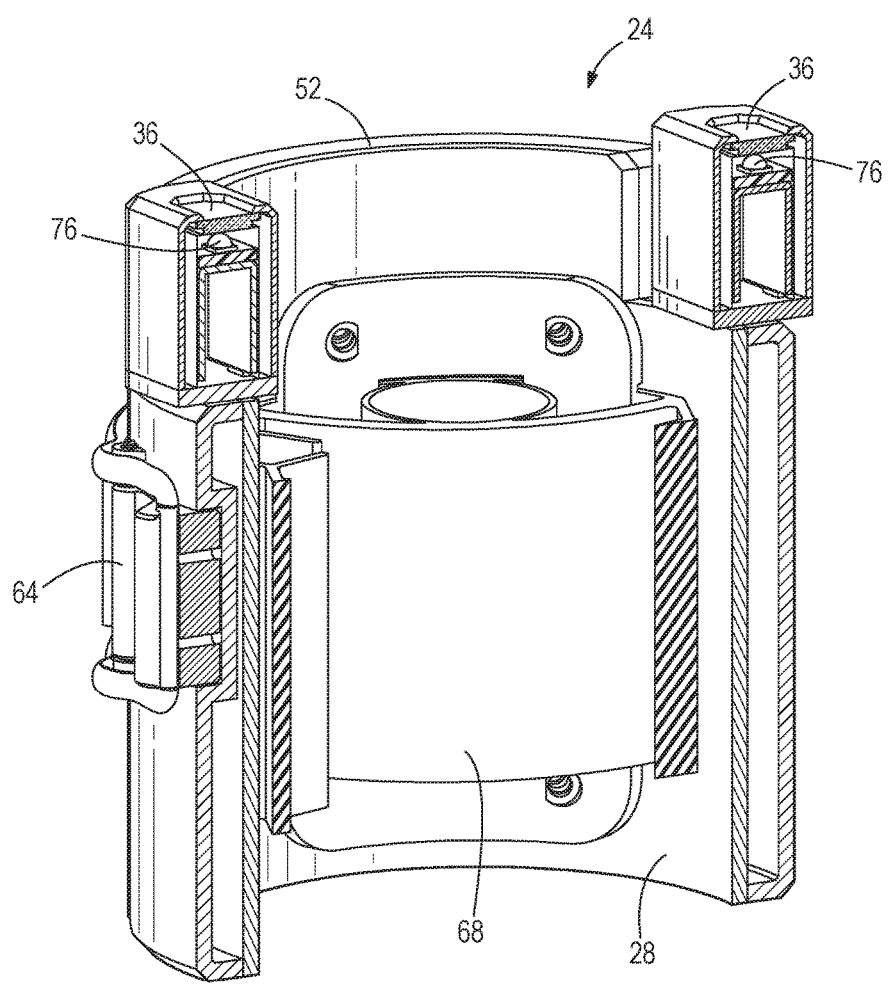
FIG. 5 is a cross-sectional view of the light, taken along section line 5-5 of FIG. 3.

As shown in FIG. 4, the power source 40 is positioned within the body 28 and electrically coupled to the first light source 32 and the second light source 36. In the illustrated embodiment, the power source 40 includes a single cell battery. More particularly, the power source 40 includes a removable power tool battery pack. The power source 40 is positioned within a battery compartment 80 of the body 28 so that the power source 40 can be removed. In the illustrated embodiment, the power source 40 is arranged generally parallel to a longitudinal axis of the hot stick to which the light 24 is attached. In other embodiments, the power source 40 may be arranged generally perpendicular to the longitudinal axis of the hot stick. In some embodiments, the battery compartment 80 is sealed to inhibit fluid and dust ingress.

Figure 2:
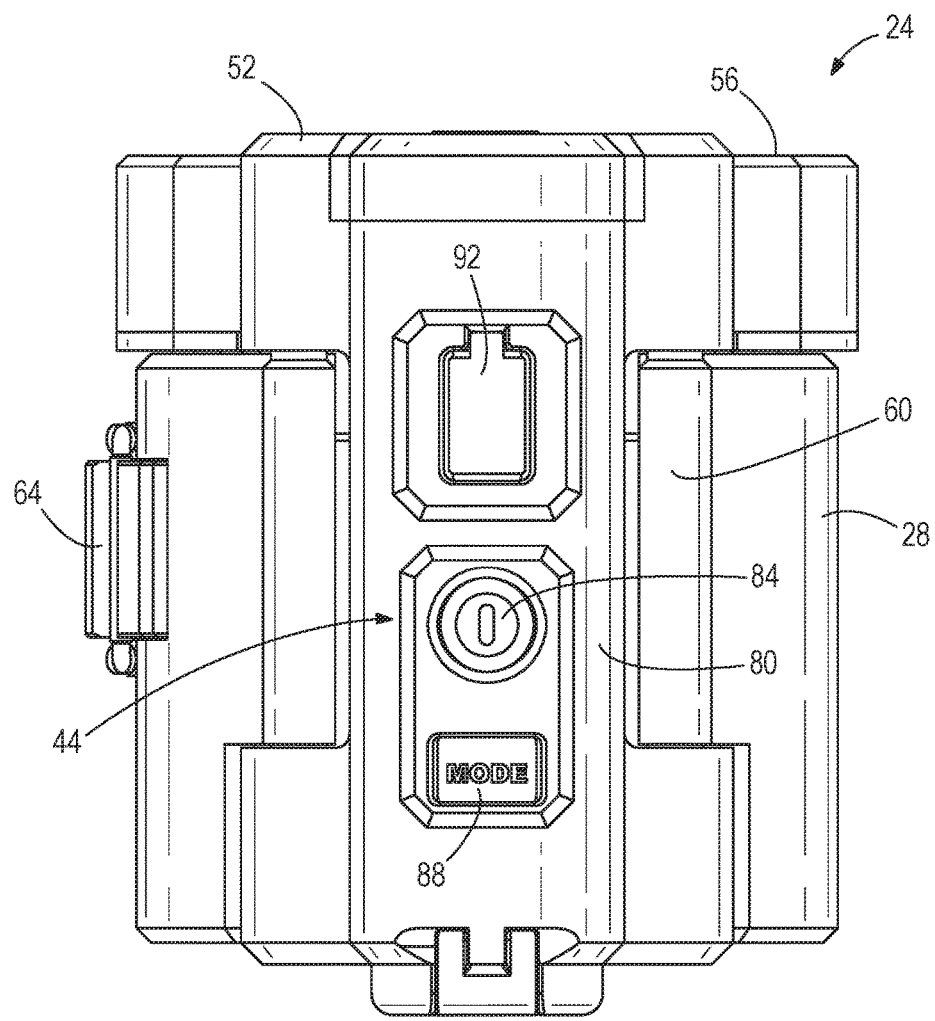
FIG. 2 is a side view of the light.

As shown in FIGS. 2 and 4, the user interface 44 is supported on the body 28 and includes a power switch 84, a mode switch 88, and a charging port 92. The power switch 84 is a button that can be depressed by a user to turn the light 24 on and off. The mode switch 88 is also a button that can be depressed by a user to change the operating mode of the light 24. For example, the light 24 can operate in a first or spot mode where only the first light source 32 is illuminated, a second or flood mode where only the second light source 36 is illuminated, or a third or fill mode where both the first light source 32 and the second light source 36 are illuminated. In other words, the light sources 32, 36 can be used individually or together by actuating the mode switch 88. In other embodiments, the power switch 84 and the mode switch 88 may be combined into a single switch.

The charging port 92 is electrically coupled to the power source 40. The charging port 92 allows the power source 40 to be recharged while the power source 40 remains in the battery compartment 80 of the body 28. The power source 40 may also be removed from the battery compartment 80 for replacement or separate charging. In the illustrated embodiment, the charging port 92 includes a USB port 94 to charge the power source 40. In other embodiments, the light 24 may include other suitable charging ports. In some embodiments, the user interface 44 may additionally include a charge status indicator to indicate the status of the power source 40.

FIGS. 6-8 illustrate the light 24 being attached to a hot stick 96. In FIG. 6, the clamp mechanism 64 is unsecured and the two sections 52, 56 of the body 28 are pivoted apart from each other to receive the hot stick 96. In FIG. 7, the two sections 52, 56 of the body 28 are pivoted together to wrap around the hot stick 96. In FIG. 8, the clamp mechanism 64 is closed to secure the light 24 to the hot stick 96.

Figure 10:
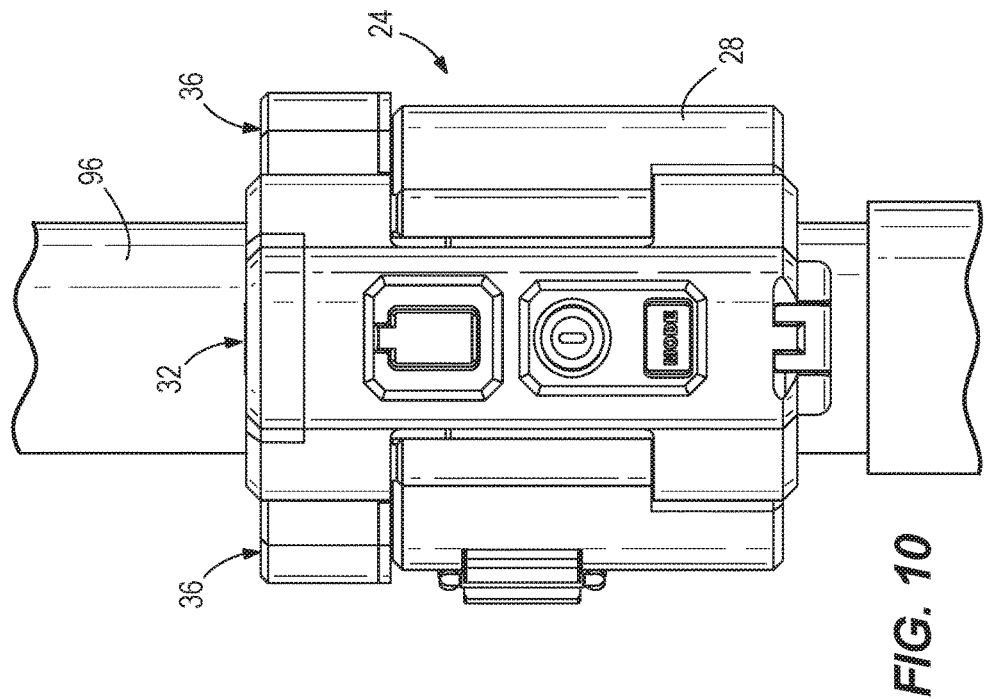
FIGS. 9 and 10 illustrate the light attached to the hot stick and operating in a spot light mode.
Figure 9:
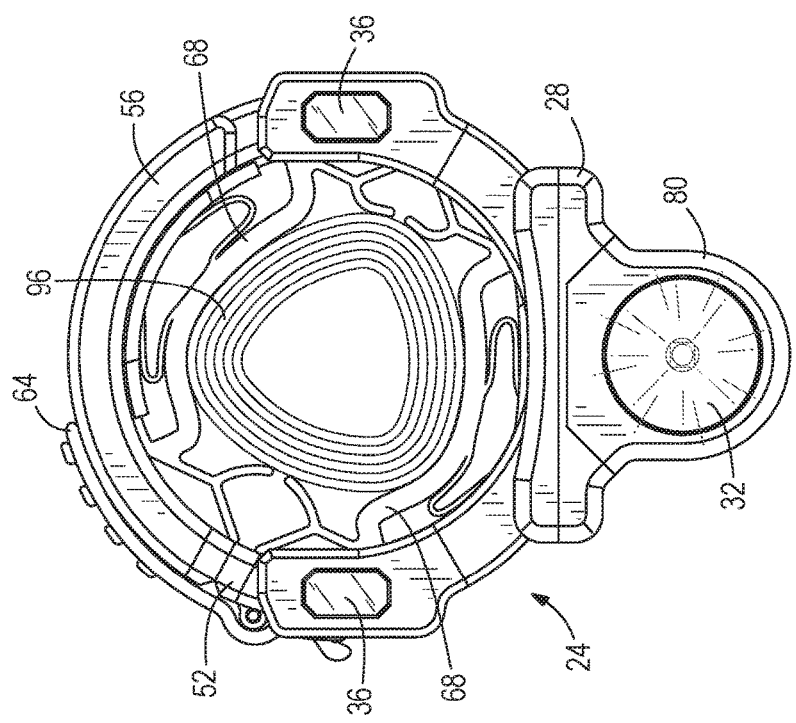

FIGS. 9 and 10 illustrate the light 24 operating in the spot mode. In this mode, the first light source 32 is illuminated.

Figure 11:
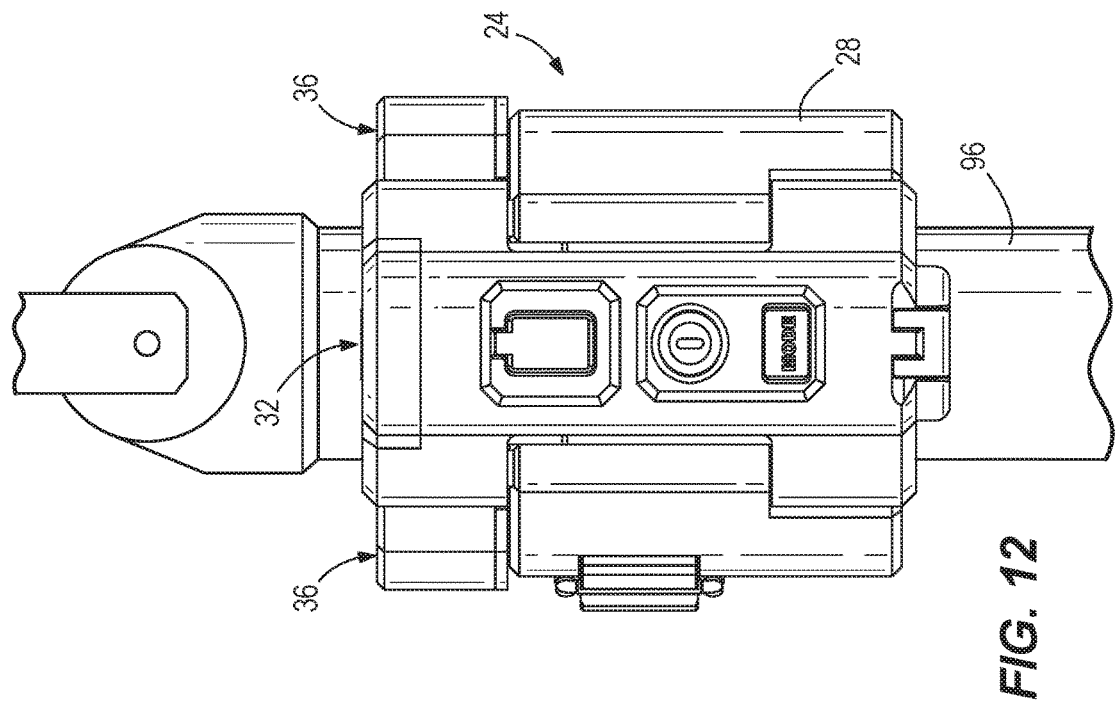
FIGS. 11 and 12 illustrate the light attached to the hot stick and operating in a flood light mode.
Figure 12:
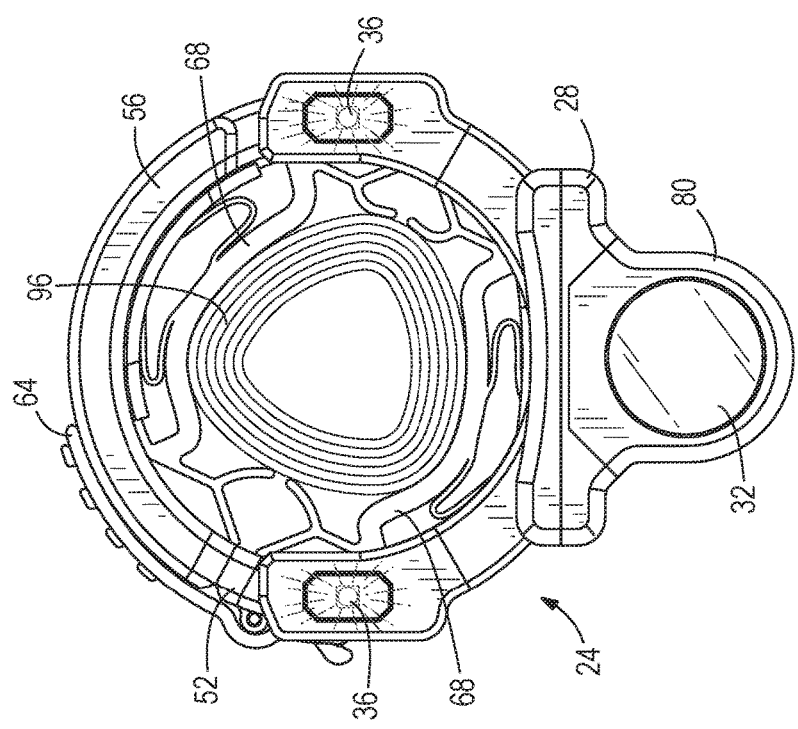
Figure 13:
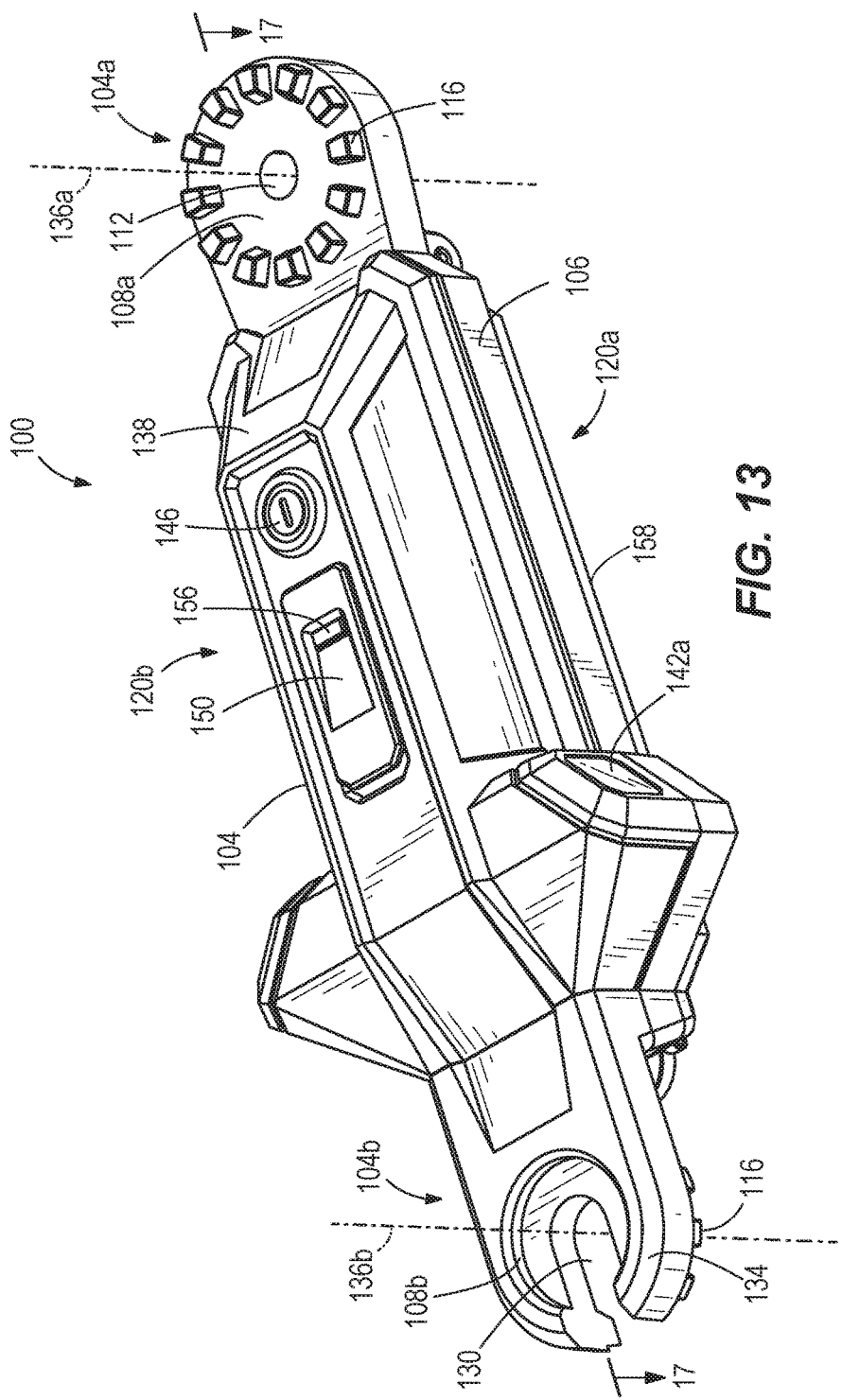
FIG. 13 is a perspective view of another light for use with a hot stick.
Figure 14:
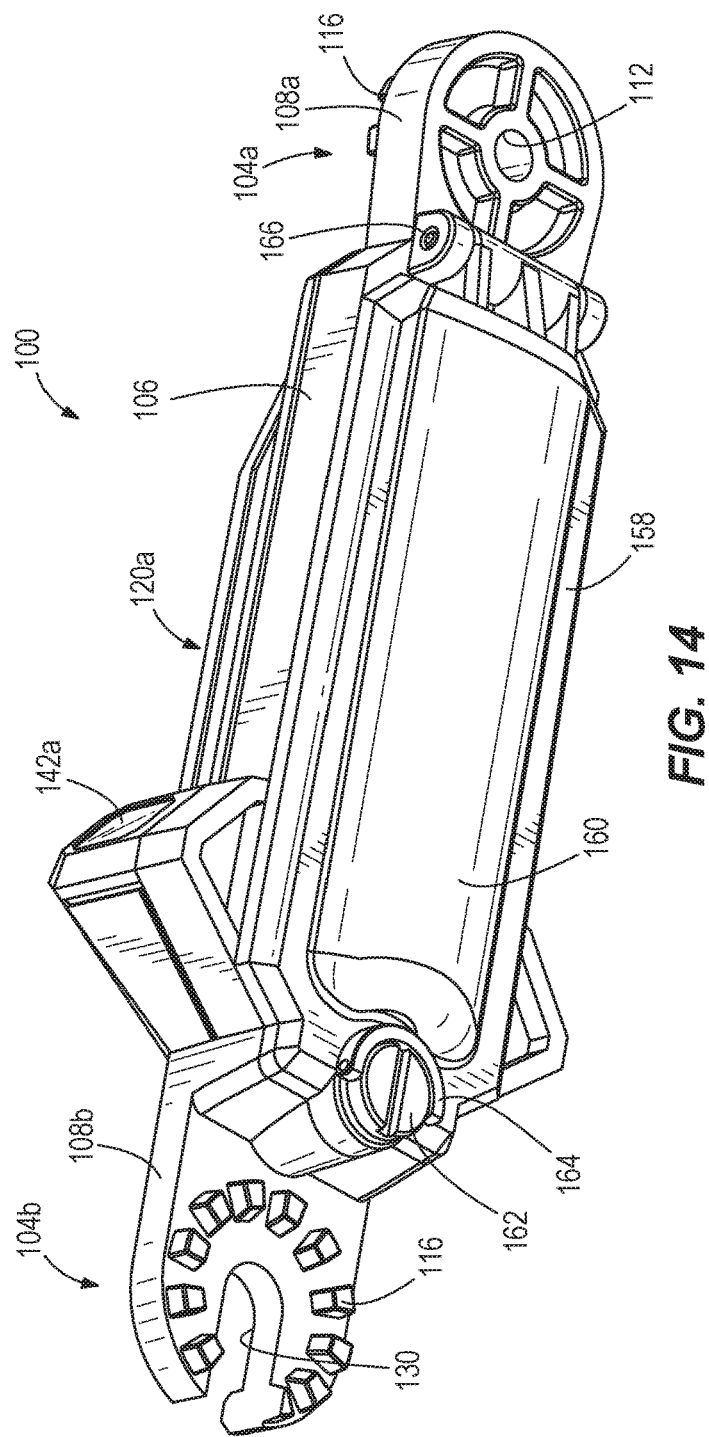
FIG. 14 is a bottom perspective view of the light of FIG. 13.
Figure 15:
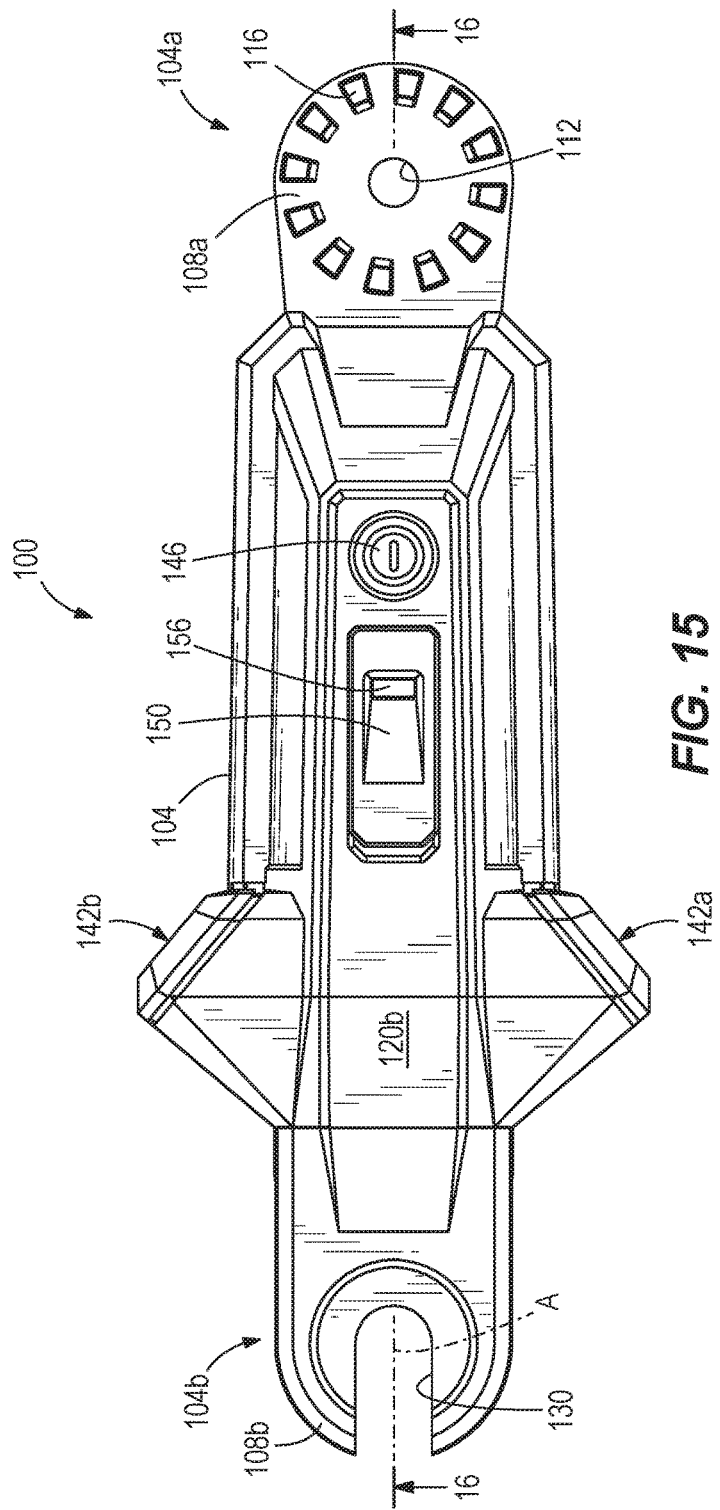
FIG. 15 is a top view of the light of FIG. 13.

FIGS. 11 and 12 illustrate the light 24 operating in the flood mode. In this mode, the second light source 36 is illuminated.

The illustrated light 24 provides a relatively compact and lightweight light that can be attached to a hot stick. For example, the light 24 can have an overall length of less than 120 mm (e.g., between 90 mm and 120 mm) and an overall diameter of less than 100 mm (e.g., between 75 mm and 95 mm). In addition, the battery compartment 80 can have a width of less than 45 mm (e.g., between 25 mm and 40 mm), such that the power source 40 only projects from the body 28 a relatively small amount. In embodiments where the power source 40 is oriented perpendicular to the hot stick (rather than parallel to the hot stick), the overall diameter could then be less than 120 mm to accommodate the length of the power source 40, but the overall length could be the same or smaller. The overall length may be related to the amount of gripping area required for the particular elastomeric material selected for the gripping sections 68.

Figure 16:
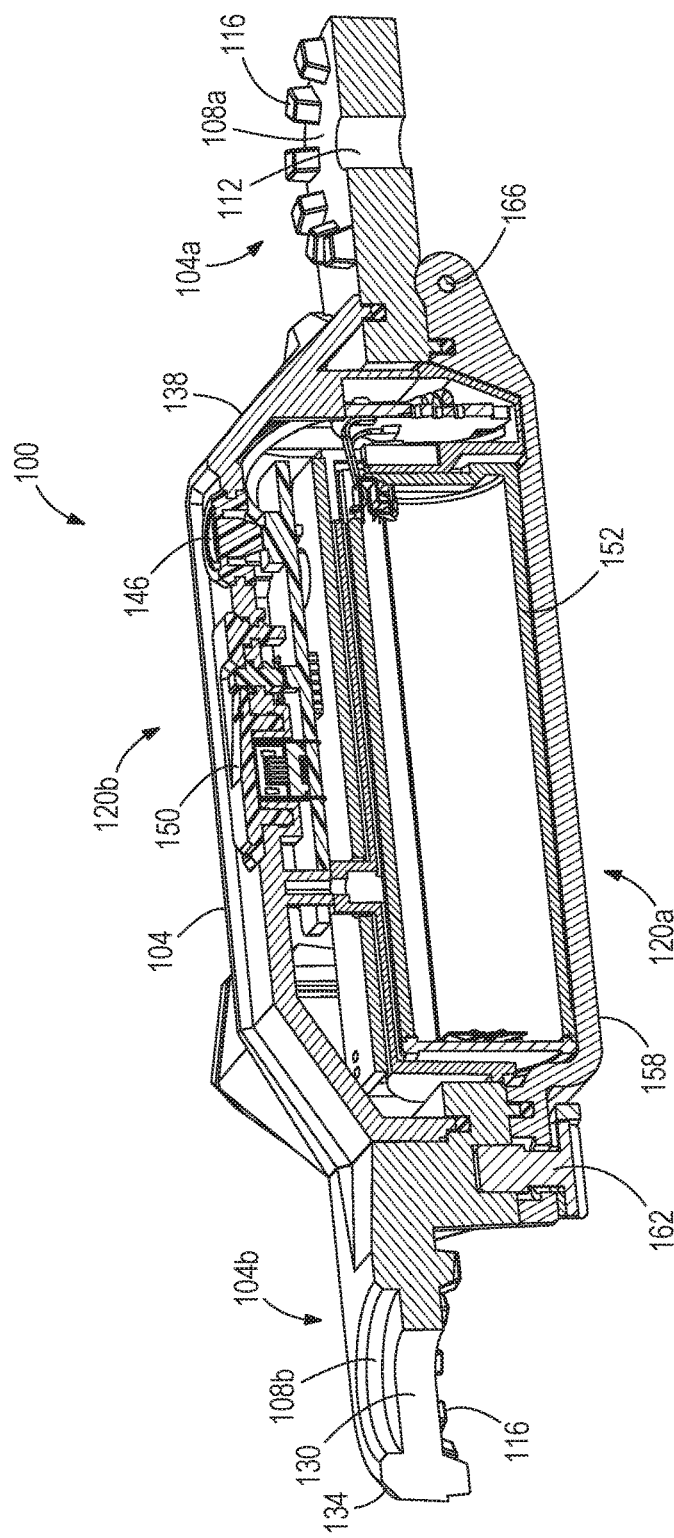
FIG. 16 is a cross-sectional view of the light, taken along section line 16-16 of FIG. 15.

FIGS. 13-18 illustrate another embodiment of a light 100 for use with a hot stick 154. The light 100 includes an elongate body 104 having a first connector 108a and a second connector 108b. More specifically, the first and second connectors 108a, 108b are a portion of a backbone 106 of the light 100. The backbone 106 may be formed of a material (e.g., aluminum) capable of withstanding axial load when fuses are detached from a fuse cut-off. Therefore, the backbone 106 undergoes the axial load, removes stress from the housing 104 and a battery door 160, and distributes the axial load throughout the light 100. The first connector 108a is positioned on a first end 104a of the body 104. The illustrated first connector 108a is generally cylindrical and includes a threaded aperture 112. The first connector 108a also includes a plurality of circumferentially-spaced projections 116 extending from one side 120b of the first end 104a. The projections 116 engage corresponding grooves and projections on a tool 124a of the hot stick 154 (FIG. 18) to connect the light 100 to the tool 124a. Although one specific embodiment of the tool 124a is shown in the figures, other types of tools may additionally or alternatively be connected to the light 100. In some embodiments, the projections 116 may extend from both sides 120a, 120b of the first end 104a, allowing the tool 124a to be connected to either or both sides 120a, 120b of the light 100. As shown in FIG. 16, a fastener 128 extends through the threaded aperture 112 and a corresponding aperture in the tool 124a to secure the light 100 to the hot stick 154. In the illustrated embodiment, the fastener 128 is a threaded fastener, such as a thumb screw. More specifically, the illustrated fastener 128 includes a flat, planar surface which may supply additional leverage than a traditional wing thumbscrew. As such, the fastener 128 may be tightened via a tool (e.g., pliers) or a user's hands.

Figure 18:
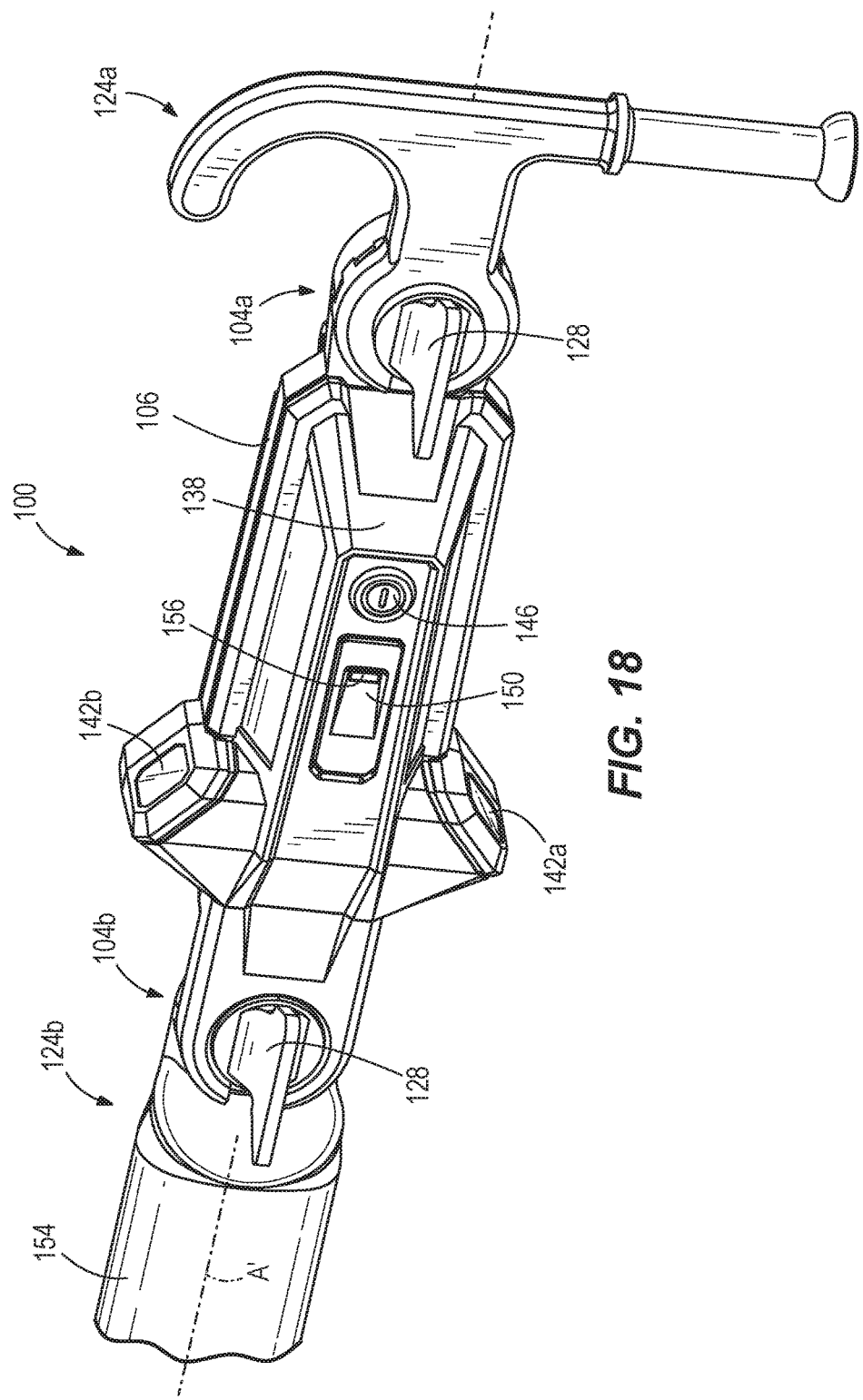
FIG. 18 is a perspective view of a portion of a hot stick assembly including the light of FIG. 13.

Referring back to FIGS. 13-15, the second connector 108b is positioned on a second end 104b of the body 104. The body 104 further defines a longitudinal axis A extending through the first connector 108a and the second connector 108b. The illustrated second connector 108b is generally cylindrical and includes an elongate aperture 130 extending through the connector 108b. The second connector 108b also includes a plurality of circumferentially-spaced projections 116 extending from one side 120a of the second end 104b, In the illustrated embodiment, the other side 120b of the second connector 108b includes a beveled surface 134. The projections 116 on the second connector 108b engage corresponding grooves and projections on an end 124b of the hot stick 154 (FIG. 18) to connect the light 100 to the hot stick 154. As shown in FIG. 18, a fastener 128 extends through the elongate aperture 130 and a corresponding aperture in the end 124b of the hot stick 154 to secure the light 100 to the hot stick 154. In the illustrated embodiment, the fastener 128 is a threaded fastener, such as a thumb screw. The elongate aperture 130 allows the light 100 to be slid off of the end 124b of the hot stick 154 by loosening the fastener 128, but without completely disconnecting the fastener 128 from the hot stick 154.

The projections 116 on the connectors 108a, 108b allow the light 100 to be secured to the hot stick 154 and to the tool 124a in different orientations (e.g., at a variety of angles). For example, in the illustrated embodiments, the connectors 108a, 108b couple to the hot stick 154 such that the longitudinal axis A of the light 100 is generally parallel to collinear to a longitudinal axis A' of the hot stick 154. Each connector 108a, 108b, however, defines a pivot axis 136a, 136b. The pivot axes 136a, 136b are perpendicular to the longitudinal axes A, A' and are collinear with longitudinal axes of the corresponding fasteners 128. When the fasteners 128 are loosened, the hot stick 154 and the tool 124a may be rotated about the pivot axes 136a, 136b to different orientations relative to the light 100. For example, the connectors 108a, 108b may couple to the hot stick 154 such that the longitudinal axis A of the light 100 is substantially perpendicular to the longitudinal axis A' of the hot stick 154. Additionally, the connectors 108a, 108b allow the light 100 to couple to the hot stick 154 at oblique angles relative to the longitudinal axis A'. The connectors 108a, 108b also allow the tool 124a to be connected to the light 100 at a different angle than how the hot stick 154 is connected to the light 100. In other words, the angle of the tool 124a relative to the light 100 is independent of the angle of the hot stick 154 relative to the light 100.

Figure 17:
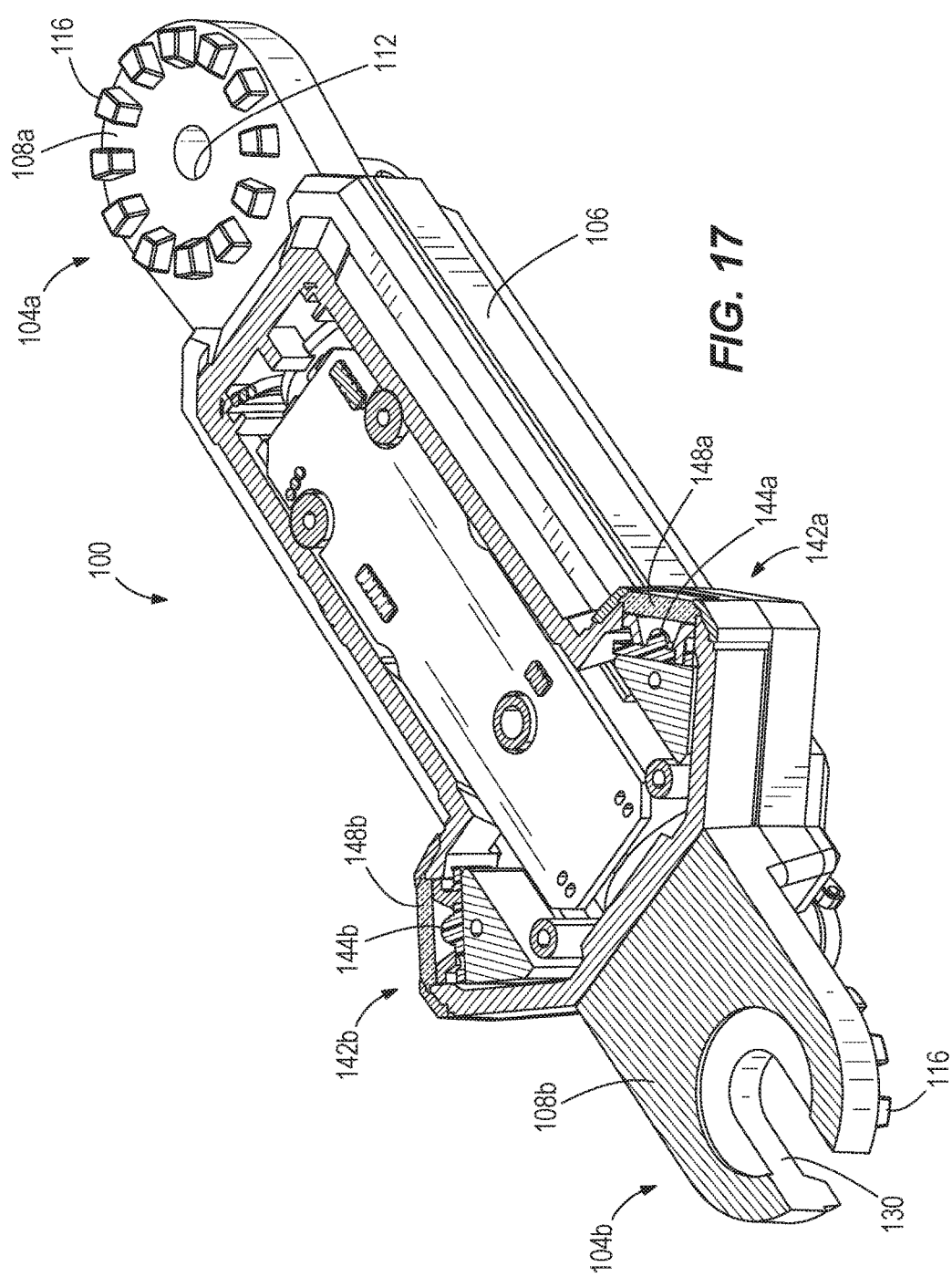
FIG. 17 is a cross-sectional view of the light, taken along section line 17-17 of FIG. 13.

As shown in FIG. 17, the elongate body 104 includes a first light source 142a and a second light source 142b. In the illustrated embodiment, the light sources 142a, 142b are closer to the second connector 108b (and thereby the hot stick) than to the first connector 108a. The first light source 142a is positioned on a first side of the longitudinal axis A, and the second light source 142b is positioned on a second side of the longitudinal axis A opposite the first light source 142a. In the illustrated embodiment, the light sources 142a, 142b include first and second LEDs 144a, 144b covered by first and second lenses 148a, 148b. The LEDs 148a, 148b are configured to provide a spot light to illuminate the first connector 108a and/or the tool 124a associated with the hot stick 154. More specifically, the first LED 148a emits light in a first direction relative to the longitudinal axis A, and the second 148b emits light in a second direction relative to the longitudinal axis A. The second direction is different than the first direction, although both LEDs 148a, 148b emit light generally toward the first connector 108a. By providing the light sources 1142a, 142b on opposite sides of the longitudinal axis A, the light sources 142a, 142b can better illuminate both ends of the tool 124a. in the illustrated embodiment, the light sources 142a, 142b include an array of LEDs which illuminate the entire hot stick 154 and eliminate shadows. In alternative embodiments, the light sources 142a, 142b may alternatively include a single LED. In still further embodiments, a ramped surface 138 of the light 100 may also or alternatively include a light source to direct light toward the tool 142a of the hot stick 154. In the illustrated embodiment, the light sources 142a, 142b are co-molded such that they are substantially waterproof. As such, the light 100 is capable of being stored in inclement weather and/or being submerged in water without causing damage to the light sources 142a, 142b.

A power source 152 is positioned within the body 104 and electrically coupled to the light sources 142a, 142b. In the illustrated embodiment, the power source 152 includes a single cell battery. More particularly, the power source 152 includes a removable power tool battery pack. The power source 152 is positioned within a battery compartment 158 of the body 104. In some embodiments, the power source 152 is removable from the battery compartment 158. The battery compartment 158 includes the sealed battery door 160. In the illustrated embodiment, the battery door 160 is a sealed battery door having, for example, a gasket extending around an inner perimeter of the battery door 160 to inhibit fluid and dust ingress. The illustrated battery door 160 also includes a thumb screw 162. The thumb screw 162 includes a semi-circular portion 164 attached to the screw 162 and rotatable in a horizontal orientation and a vertical orientation. The screw 162 may be unscrewed using a tool (e.g., a screwdriver) or via a user's hands. In order to remove the power source 152 from the battery compartment 158, the semi-circular portion 164 may be rotated in the vertical direction and then in the horizontal direction, which then allows the user to pivot the battery door 160 open about a pivot point 166. In other embodiments, the power source 152 is not removable from the battery compartment 158. In the illustrated embodiment, the power source 152 is arranged generally parallel to the longitudinal axis A' of the hot stick 154 to which the light 100 is attached. In other embodiments, the power source 152 may be arranged generally perpendicular to the longitudinal axis A' of the hot stick 154. In the illustrated embodiment, the battery door 160 and the housing 104 are gasketed to the backbone 106 in order to protect the internal components (e.g., power source 152) from external conditions. For example, the light 100 may be exposed to inclement weather (e.g., rain, snow, etc.), submerged in water, etc. without causing damage to the light 100. These aspects provide the light 100 with an IP67 rating for waterproofing.

As shown in FIGS. 13-18, the body 104 also supports a power switch 146 and a USB port 150. The illustrated power switch 146 is a button that can be depressed by a user to turn the light 100 on and off. The USB port 150 is electrically coupled to the battery compartment 158 to charge the power source 152. The body 104 further supports a charge status indicator 156 to indicate a charge status of the power source 152. The illustrated charge status indicator 156 is positioned adjacent the USB port 150. When the power source 152 is turning on, the charge status indicator 156 may emit a colored (e.g., red, yellow, green, etc.) light. Additionally, when the power source 152 is charging, the charge status indicator 156 may emit a first colored light (e.g., red), and when the power source 152 is fully charged, the charge status indicator 156 may emit a second colored light (e.g., green). In still further embodiments, the charge status indicator 156 may flash to indicate that the power source 152 is charging or to indicate an error in the charging process. In other embodiments, the light 100 may include other suitable charging ports and/or a mode switch to change an operating characteristic (e.g., brightness) of the light sources 142a, 142b. In the illustrated embodiments, the power switch 146, USB port 150, and charge status indicator 156 are co-molded such that they are substantially waterproof. As such, the light 100 is capable of being stored in inclement weather and/or being submerged in water without causing damage to the light sources power switch 146, USB port 150, and charge status indicator 156. Furthermore, the light 100 may include additional components on the body 104 which are waterproof.

In the illustrated embodiments, the power switch 146 operates the first light source 142a and/or the second light source 142b in at least two modes: a first mode where the first and/or second light sources 142a, 142b emit light having a first intensity, and a second mode where the first and/or second light sources 142a, 142b emit light having a second intensity different from the first intensity. In some embodiments, the first intensity is at least 200 lumens, or is between 200 lumens and 400 lumens. Additionally, the second intensity is at least 75 lumens, or is between 75 lumens and 150 lumens. In the illustrated embodiments, the first intensity is at least 350 lumens, and the second intensity is approximately 107 lumens. The illustrated light 100 has a sufficient voltage to power the first and second light sources 142a, 142b for an extended period of time. For example, when operating in the second mode, the light sources 142a, 142b can emit light for at least 6 hours. In the illustrated embodiment, the light can operate in the second mode for approximately 8.5 hours. In alternative embodiments, the power switch 146 may operate the first and second light sources 142a, 142b in additional modes.

Figure 19:
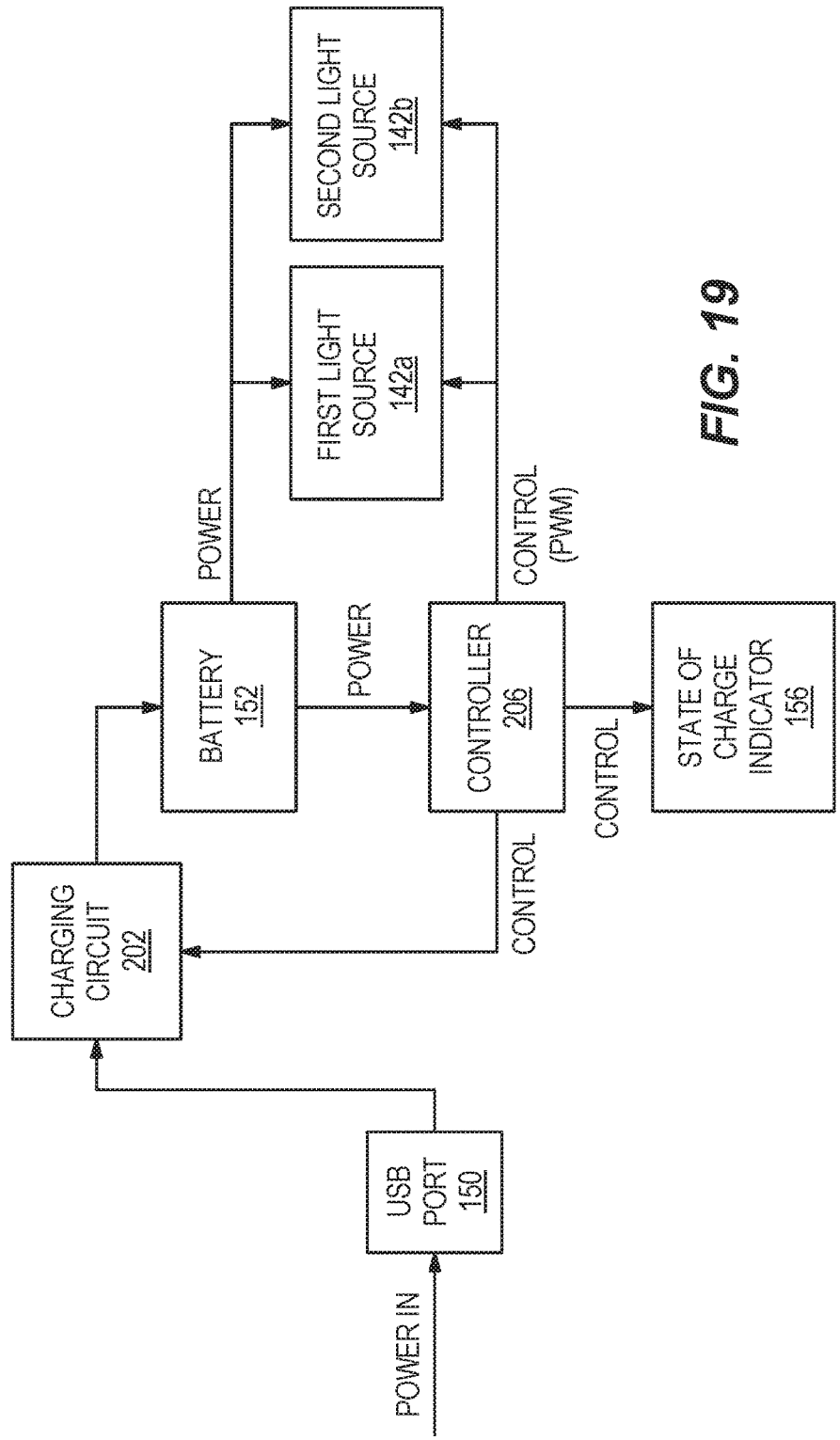
FIG. 19 is a block diagram of a control system of the light of FIG. 1 or the light of FIG. 13.
Figure 20:
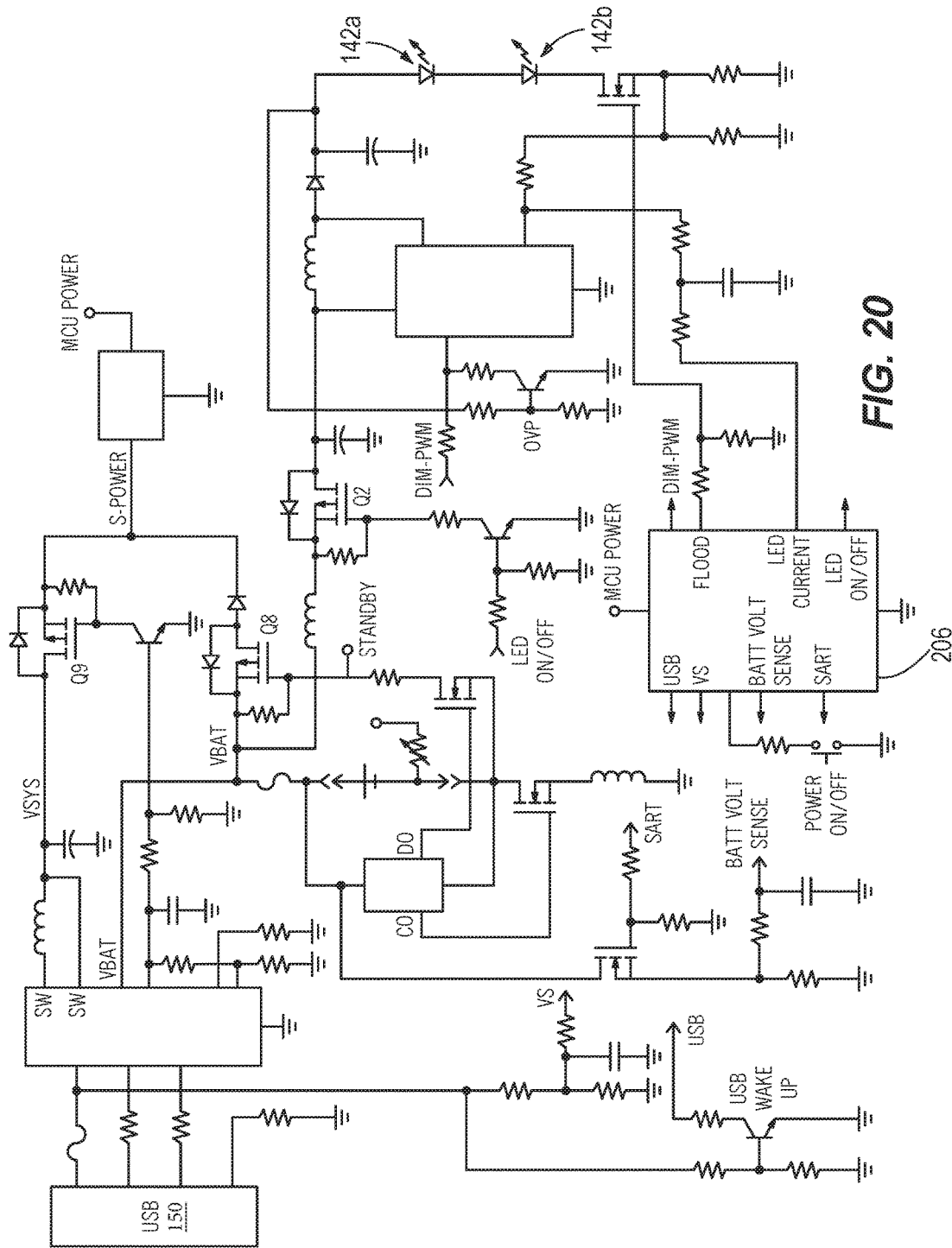
FIG. 20 is a schematic representation of a control system of the light of FIG. 1 or the light of FIG. 13.

As shown in FIGS. 19 and 20, the illustrated light 100 includes the USB port 150, a charging circuit 202, the power source (e.g., battery) 152, a controller 206, the charge status indicator 156, the first light source 142a, and the second light source 142b. The USB port 150 provides DC power to the charging circuit 02 to charge the battery 152. The battery 152 sends a control signal to the controller 206 to indicate that power is provided through the battery 152. The battery 152 is additionally configured to output DC power from the battery 152 to the first light source 142a and/or the second light source 142b to start or stop emitting light. In FIG. 19, the first and second light sources 142a, 142b are shown in parallel. However, in alternative embodiments (FIG. 20), the light sources 142a, 142b may be arranged in series.

The charging circuit 202 is electrically connected to the USB port 150, the battery 152, and the controller 206. The charging circuit 202 receives DC power from the USB port 150 and then controls the charging current 202 provided to the battery 152. The charging circuit 202 sends and receives information regarding the battery 152 to and from the controller 206. The battery 152 may be connected to the controller 206 and directly with a DC power source such as, for example, the USB port 150. For example, the charging circuit 202 may communicate to the controller 206 the charge status of the battery 152. If the battery 152 includes a charge level below a threshold voltage, the controller 206 may send control signals to the charging circuit 202 to charge the battery 152 via the USB port 150, while still providing power to the first and/or second light sources 142a, 142b. The illustrated light 100 may additionally include a switching circuit, an LED driver circuit, etc. as illustrated in FIG. 20.

The controller 206 is electrically connected to the battery 152, the state of charge indicator 156, the charging circuit 202, the first light source 142a, and the second light source 142b. The controller 206 receives indication signals from the charging circuit 202. The controller 206 sends control signals to the charge status indicator 156, communicating the state of charge of the battery 152 and allowing the indicator 156 to emit a signal to indicate the state of the charge. The controller 206 also sends control signals (e.g., PWM signals) to the first light source 142a and/or the second light source 142b to start or stop emitting light. In the illustrated embodiment, the first and second light sources 142a, 142b are configured to receive DC power from the battery 152. If the state of charge of the battery 152 is insufficient (e.g., the state of charge of the battery 152 is below a voltage threshold), the controller 206 may send control signals to the charging circuit 202 to charge the battery 152. The controller 206 includes a processor and memory storing software executed by the processor to affect the functionality of the controller 206 described herein.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A light for use with a hot stick, the light comprising:
an elongate body including a first connector on a first end of the elongate body and a second connector on a second end of the elongate body, the first connector configured to connect to the hot stick, the second connector configured to connect to a tool associated with the hot stick, the elongate body defining a longitudinal axis extending through the first connector and the second connector;
a first light source supported by the elongate body and including a first light emitting diode configured to emit light in a first direction relative to the longitudinal axis;
a second light source supported by the elongate body and including a second light emitting diode configured to emit light in a second direction relative to the longitudinal axis that is different than the first direction;
a power source positioned within the elongate body and electrically coupled to the first light source and the second light source; and
a user interface supported on the elongate body to control operation of the first and second light sources.

2. The light of claim 1, wherein the first light source is positioned on one side of the longitudinal axis, and wherein the second light source is positioned on another side of the longitudinal axis opposite from the first light source.

3. The light of claim 2, wherein the first light source is configured to emit light away from the longitudinal axis and toward the tool associated with the hot stick, and wherein the second light source is configured to emit light away from the longitudinal axis and toward the tool associated with the hot stick.

4. The light of claim 1, wherein the elongate body includes a battery compartment, and wherein the power source includes a battery pack positioned within the battery compartment.

5. The light of claim 4, wherein the battery pack is a rechargeable battery pack, and wherein the user interface includes a charging port electrically coupled to the rechargeable battery pack and operable to recharge the rechargeable battery pack.

6. The light of claim 5, wherein the charging port includes a USB port.

7. The light of claim 5, wherein the user interface also includes a charge status indicator.

8. The light of claim 4, wherein the battery compartment includes a sealed battery door that is openable to access the battery pack.

9. The light of claim 7, wherein the sealed battery door includes a thumb screw operable to secure the sealed battery door in a closed position.

10. The light of claim 4, wherein the battery pack is arranged parallel to the longitudinal axis.

11. The light of claim 1, wherein the user interface includes a power switch operable to control operation of the light source.

12. The light of claim 11, wherein the power switch is operable to change an operating mode of the light between a first mode, in which light having a first intensity is emitted from the first and second light emitting diodes, and a second mode, in which light having a second intensity that is different than the first intensity is emitted from the first and second light emitting diodes.

13. The light of claim 1, wherein the first connector includes a first fastener configured to secure the first connector to the hot stick, and wherein the second connector includes a second fastener configured to secure the second connector to the tool associated with the hot stick.

14. The light of claim 13, wherein the light is rotatable relative to the hot stick about a pivot axis defined by the first connector and extending through the first fastener, and wherein the light is rotatable relative to the tool about a pivot axis defined by the second connector and extending through the second fastener.

15. The light of claim 14, wherein the first connector includes a plurality of projections configured to engage the hot stick to secure the light in a rotational position relative to the hot stick, and wherein the second connector includes a plurality of projections configured to engage the tool to secure the light in a rotational position relative to the tool.

16. A light for use with a hot stick, the light comprising:
a body configured to be coupled to an end of the hot stick adjacent a tool associated with the hot stick, the body including a battery compartment;
a light source supported by the body and including a light emitting diode configured to emit light toward the tool associated with the hot stick;
a rechargeable battery pack positioned within the battery compartment;
a charging port supported by the body and electrically coupled to the rechargeable battery pack, the charging port operable to recharge the rechargeable battery pack; and
a power switch supported by the body and electrically coupled to the light source, the power switch operable to control operation of the light source.

17. The light of claim 16, wherein the charging port includes a USB port.

18. The light of claim 16, wherein the battery compartment includes a sealed battery door that is openable to access the rechargeable battery pack, and wherein the sealed battery door includes a thumb screw operable to secure the sealed battery door in a closed position.

19. The light of claim 16, further comprising a charge status indicator supported by the body and electrically coupled to the charging port.

20. A hot stick assembly comprising:
a hot stick;
a tool associated with the hot stick; and
a light including
an elongate body having a first connector on a first end of the elongate body and a second connector on a second end of the elongate body, the first connector connected to the hot stick light, the second connector connected to the tool, the elongate body defining a longitudinal axis extending through the first connector and the second connector,
a first light source supported by the elongate body and having a first light emitting diode configured to emit light toward the tool in a first direction relative to the longitudinal axis,
a second light source supported by the elongate body and having a second light emitting diode configured to emit light toward the tool in a second direction relative to the longitudinal axis that is different than the first direction,
a power source positioned within the elongate body and electrically coupled to the first light source and the second light source, and
a user interface supported on the elongate body to control operation of the first and second light sources.

* * * * *